Aug. 28, 1928.
E. H. ELLISON
1,681,932
METHOD OF MANUFACTURING BALANCE ARMS FOR WINDOWS
Filed Jan. 27, 1925   5 Sheets-Sheet 1
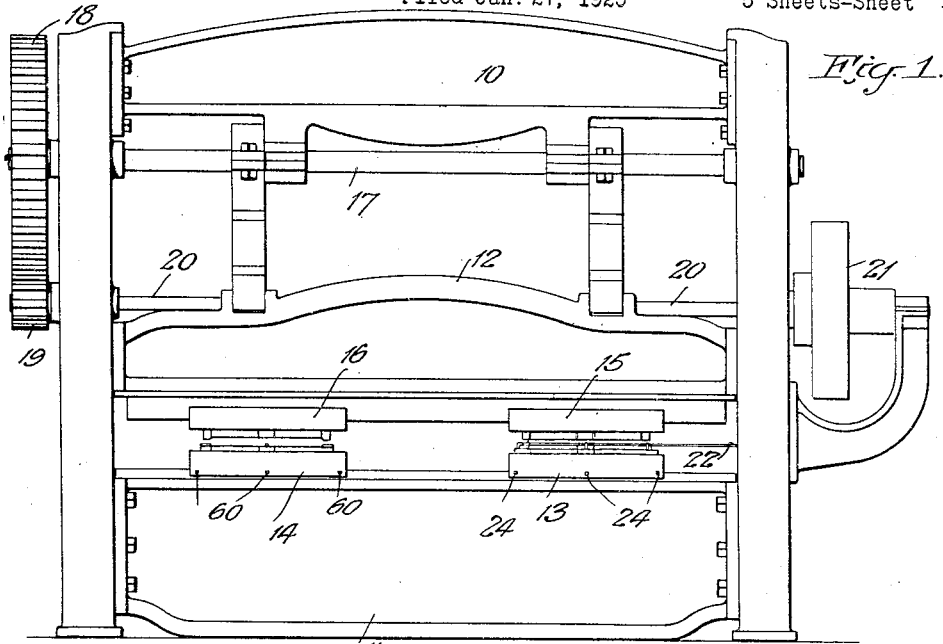
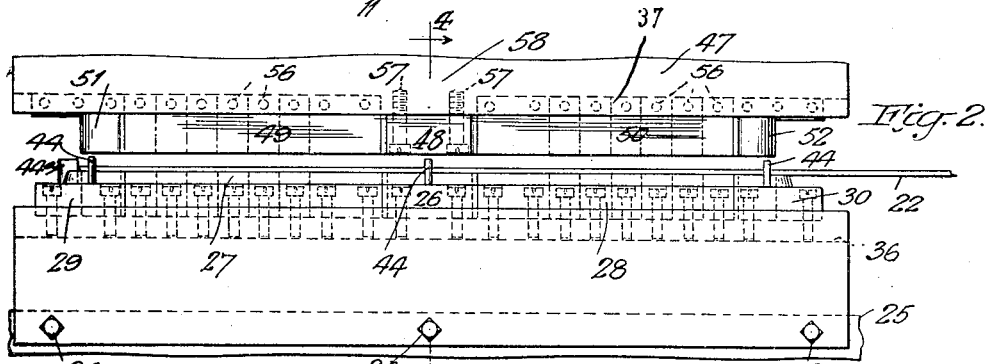
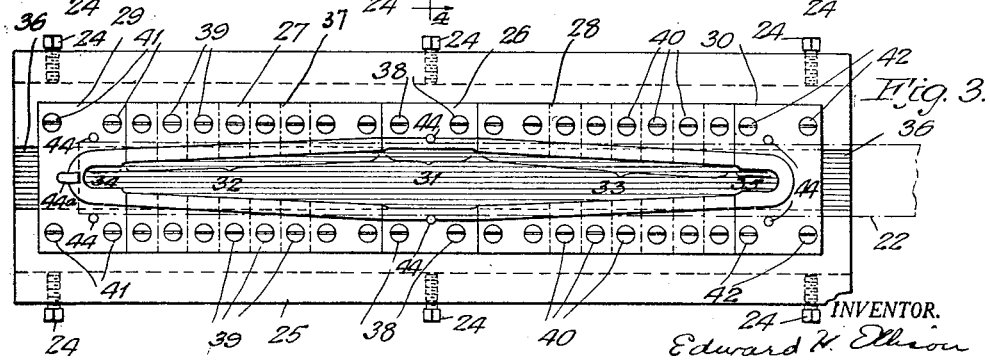
INVENTOR.
Edward H. Ellison
BY
Bohlbero Lidbetter
ATTORNEYS Aug. 28, 1928.
E. H. ELLISON
1,681,932
METHOD OF MANUFACTURING BALANCE ARMS FOR WINDOWS
Filed Jan. 27, 1925 5 Sheets-Sheet 2
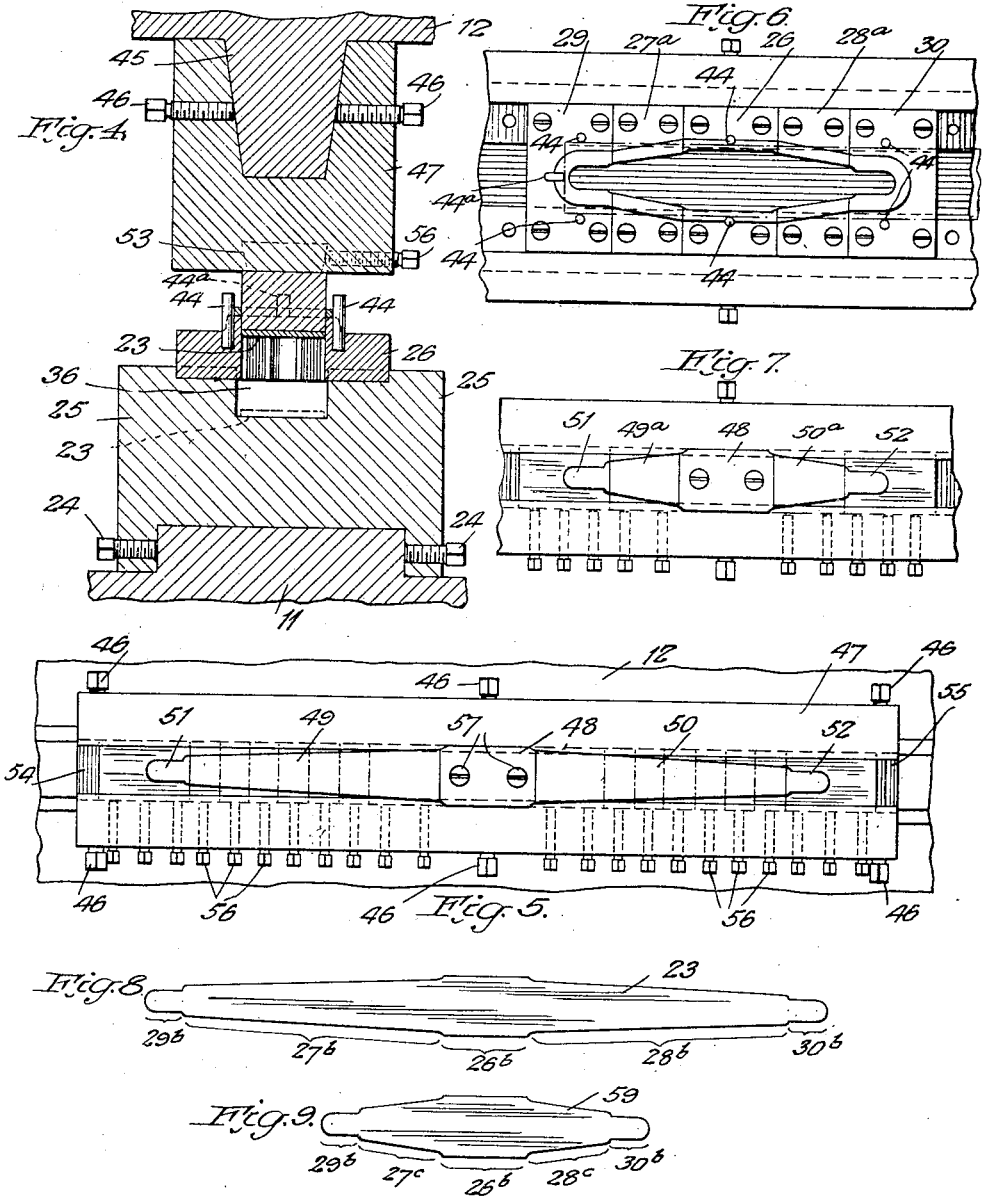
INVENTOR.
Edward H. Ellison
BY
ATTORNEYS Aug. 28, 1928.
E. H. ELLISON
1,681,932
METHOD OF MANUFACTURING BALANCE ARMS FOR WINDOWS
Filed Jan. 27, 1925     5 Sheets-Sheet 3
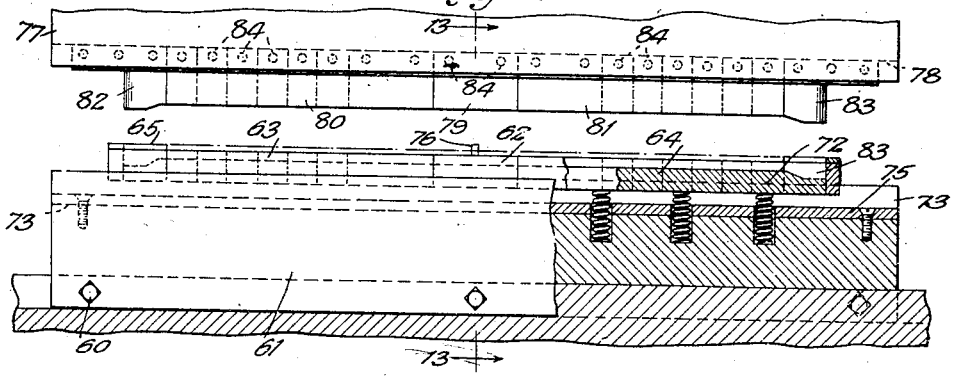
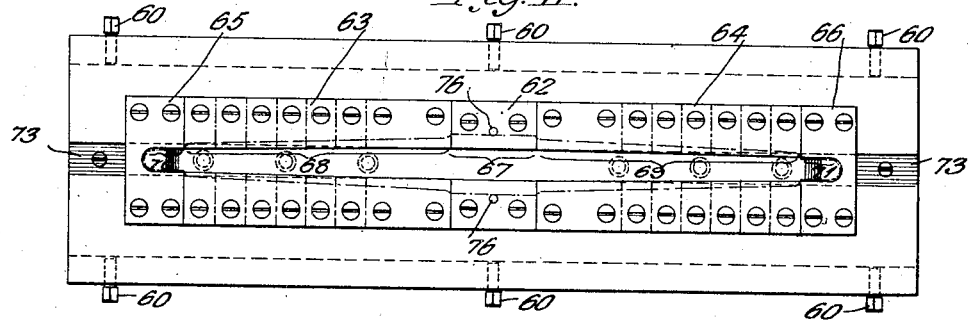
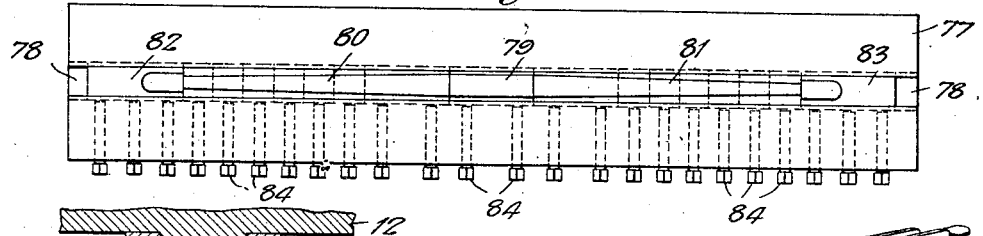
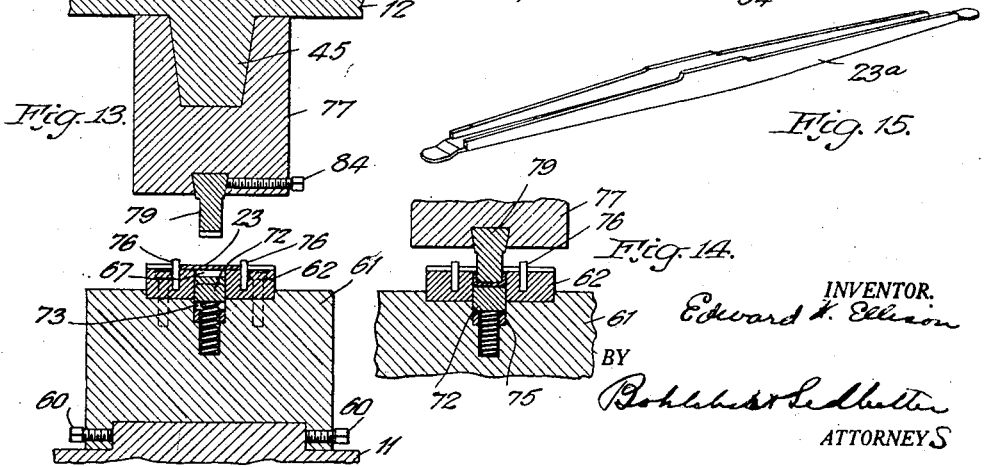
INVENTOR.
Edward H. Ellison
BY
Bohleber & Ledbetter
ATTORNEYS

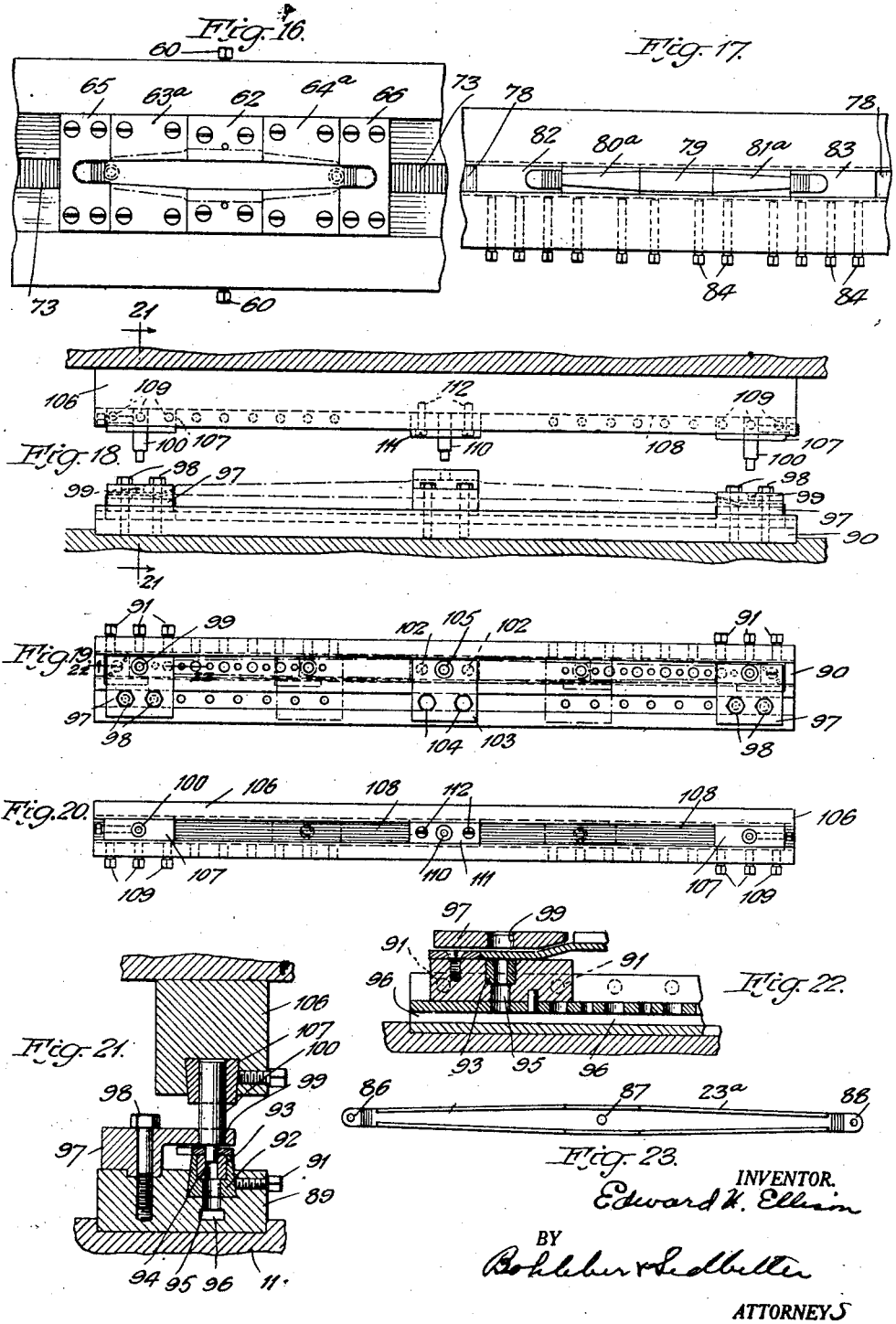

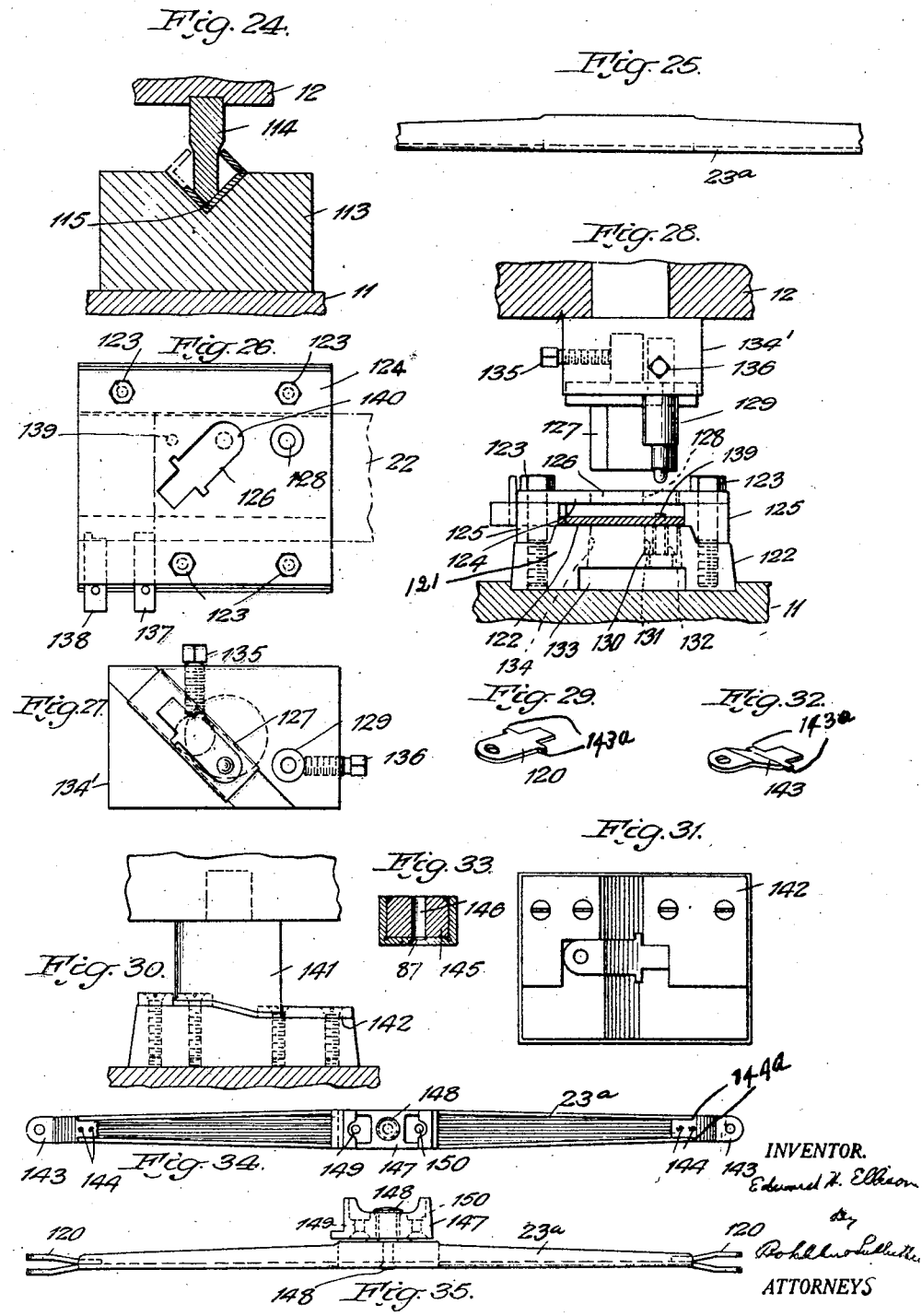

Patented Aug. 28, 1928.

1,681,932

UNITED STATES PATENT OFFICE.

EDWARD H. ELLISON, OF JAMESTOWN, NEW YORK, ASSIGNOR TO AUSTRAL WINDOW COMPANY, OF NEW YORK, N. Y., A CORPORATION OF MAINE.

METHOD OF MANUFACTURING BALANCE ARMS FOR WINDOWS.

Application filed January 27, 1925. Serial No. 5,034.

My invention relates to a method for the manufacture of balance arms to be used in connection with balanced windows of the type described in the United States Letters Patent to E. G. Abell, No. 788,182, granted April 25, 1905, reissued November 14, 1905, No. 12,409, and United States Letters Patent No. 821,510 to Alexander Knox, granted May 22, 1905, in which patents are shown upper and lower sashes pivotally connected with the frame in such a manner as to permit substantial and simultaneous vertical movement of the sashes and also permitting simultaneously with the said vertical movement of a limited swinging or turning movement of each sash about its pivotal connection.

Heretofore balance arms of the type referred to in the above mentioned patents were manufactured from malleable iron castings, but as manufactured from such castings they have a number of inherent objections chief of which are the following: (1) after the manufacture of the balance arms the castings have to be examined for defects due chiefly to imperfect molding, cinders, sand holes and excessive shrinkage with the result that the discards not infrequently run as high as fifty per cent; (2) that in order to provide for the irregularities in the shrinkage of the castings they are made about one-quarter of an inch longer than the required size with a result that a milling operation at each end of each arm is necessitated in order to reduce it to the proper length; (4) after the castings are made they are placed in gigs to enable the end and center pivot holes to be drilled and that during this drilling operation flaws are often detected so that a number of arms have to be discarded entirely with a result that the labor put on the discarded arms for drilling purposes becomes a total loss; (4) after the arms are assembled to the pivot block in operative relation to the windows they have to be tested again to ascertain whether or not they have the proper offset; (5) due to the warping and twisting of the castings in the cooling and annealing process it is impossible to reduce most of these operations to a mechanical basis; and (6) the time required between the placing of an order in the factory and the delivery of the finished product to the store room ranges from three to six months due to so many conditions over which there is no control, with a result that it is very difficult to provide for the necessary requirements without carrying a comparatively large supply.

My present invention has to do with a method of manufacturing balance arms to overcome, among other things, the objections above enumerated. According to my invention the balance arms are preferably manufactured from a stampable metal. Aside from the objections above noted, my method possesses several features and advantages over the method of manufacturing balance arms heretofore in vogue as will more fully hereinafter appear.

The material employed in the manufacture of balance arms according to my method is preferably hot rolled steel which can be ordered from the stock of any mill and is a standard product. As no time is required for the preparation of this material deliveries can be made immediately. As manufactured by my improved method these strips of hot rolled steel are fed in at one end of the press which, with one stroke, produces the arm blank, and, preferably at the same time, a formed-up balance arm; that is to say two men are in charge of the press, one feeding in the material to be blanked and the other man thereafter placing the blank into the forming die. By a punching operation the formed-up balance arm is then provided at its center and ends with pivot holes. When they come from the press these arms manufactured, as they preferably are, from stampable metal, are absolutely uniform to one-thousandths of an inch and require no straightening operation or operations whatever. In the forming operation each end of the arm is offset which serves as one of the bearing members for each sash bolt pivot. After the arms are formed up and punched in the manner just stated a companion bearing member for each sash bolt pivot, previously formed and punched, is spot welded to each end of the arm and the joint sealed, thus providing a forked end on the arm for the sash bolt. Either before or after said members have been so spot welded the center of the arm is put through the second forming operation to square the edges at the center after which the center filler piece is electro-welded in place. The sash eye bolts are then riveted in place to the forked ends of the arm. Practically all of these operations, with the exception of the electro-welding, are accomplished by machines with the result that the production is much more rapid and the personal equation is reduced to a minimum; in fact inside of three weeks from the time of placing of an order in the factory completed arms can be placed in the store room ready for shipment.

Other objects, advantages and features of my improved method will more fully appear from the detailed description below taken in connection with the accompanying drawings, in which Fig. 1 illustrates diagrammatically a front view of a standard power press equipped with punches and dies for cutting the blanks from the raw stock and for effecting the first forming operation.

Fig. 2 is a side view of the punch and die employed for blanking the raw stock.

Fig. 3 is a top plan view of the blanking die.

Fig. 4 is a cross section of the punch and die employed for blanking the raw stock taken on the line 4—4 of Fig. 2.

Fig. 5 is a bottom plan view of the blanking punch.

Fig. 6 illustrates a top plan view of the blanking die showing the intermediate die sections which are employed for stamping a balance arm blank of shorter length.

Fig. 7 illustrates a bottom plan view of the punch after those sections have been substituted therefor corresponding to the substituted die sections illustrated in Fig. 6.

Fig. 8 illustrates a blank cut from the raw stock by means of the punch and die sections illustrated in Figs. 2, 3, 4 and 5.

Fig. 9 illustrates a blank cut from the raw stock by means of the punch and die sections illustrated in Figs. 6 and 7.

Fig. 10 illustrates a side view of the punch and die for effecting the first forming-up operation.

Fig. 11 illustrates a top plan view of the forming die shown in Fig. 10.

Fig. 12 illustrates a bottom plan view of the forming punch.

Fig. 13 is a section of the forming punch and die taken on the line 13—13 of Fig. 10.

Fig. 14 is a section similar to Fig. 13 but with the punch and die located in different relative positions.

Fig. 15 is a perspective view of the balance arm after having been formed-up by means of the forming punch and die illustrated in Figs. 10 to 14 inclusive.

Fig. 16 illustrates a top plan view of the forming die having certain die sections substituted for the purpose of forming up a balance arm of decreased length.

Fig. 17 is a bottom plan view of the forming punch having certain punch sections substituted corresponding to the substituted die sections illustrated in Fig. 16.

Fig. 18 illustrates a side view of the punches and dies employed for perforating the center and ends of the formed-up arm.

Fig. 19 is a top plan view of the perforating dies.

Fig. 20 is a bottom plan view of the perforating punches.

Fig. 21 is a section taken on the line 21—21 of Fig. 18, showing the position of the parts after the punches and dies have been brought together to punch the holes in the balance arm.

Fig. 22 is a section on an enlarged scale taken on the line 22—22 of Fig. 19.

Fig. 23 illustrates a view, looking into the channel thereof, of the balance arm after the same has been properly formed up and the holes punched at the center and at the ends thereof.

Fig. 24 is a cross section of the punch and die employed for performing the second forming operation.

Fig. 25 illustrates the central portion of the balance arm after it has been squared or formed up by means of the punch and die illustrated in Fig. 24.

Fig. 26 is a top plan view of the die employed for blanking and perforating the clip from the raw stock.

Fig. 27 is a bottom plan view of the punch for blanking and perforating the clip.

Fig. 28 is a cross section of the punch and die illustrated in Figs. 26 and 27 showing the relative position of the same just before the blanking and the perforating of the clip is effected.

Fig. 29 shows the clip after it has been blanked and perforated by means of the punch and die illustrated in Figs. 26, 27 and 28.

Fig. 30 illustrates an elevation of the punch and die employed for forming-up the clip after the same has been blanked and perforated.

Fig. 31 illustrates a top plan view of the die illustrated in Fig. 30.

Fig. 32 is a perspective view of the clip after the same has been formed-up by means of the punch and die illustrated in Figs. 30 and 31.

Fig. 33 is a cross section of the balance arm illustrating a filler block properly positioned and welded in the channel at the center of the arm.

Fig. 34 is a top plan view of the balance arm illustrating the pivot block secured thereto and with the clip illustrated in Fig. 32 spot welded to the arm at each end thereof.

Fig. 35 is a view taken at right angles to the view illustrated in Fig. 34.

My invention has to do with a method of manufacturing from raw stock of balance arms for windows. In the practice of the same flat blanks, such as illustrated in Fig. 8, are cut from the raw stock illustrated at 22 in Figs. 2 and 3. This raw stock is preferably hot rolled steel and is, for example, approximately one-eighth of an inch in thickness, approximately two and one-eighth inches wide, and about eight to ten feet in length. After the flat blanks have been cut from the raw stock they are then subjected to a pressing operation to effect the formed-up arm illustrated in Fig. 15. The formed-up arms are then perforated as illustrated in Fig. 23, after which the central portion of the arms are subjected to a second forming operation to square up the center as illustrated in Fig. 25. The foregoing operations results in a channeled balance arm or lever having tapering arms. The central portion of the lever between the tapering arms has parallel edges which, as pointed out, have been "squared up." The balance arm has an offset portion or clip at each end thereof for the sash eye bolts. The other clip is stamped and perforated from the same raw stock 22, as illustrated in Fig. 29, after which the clip is shaped by a suitable punch and die to the form illustrated in Fig. 32. These clips are then spot welded to the arm as shown in Fig. 34, after which the filler block at the center is welded in place, preferably by an arc welding operation, as illustrated in Fig. 33. The particular form taken by the central portion permits the securing of the filler block in a simple manner between the flanges so that but few exposed joints are afforded. The various mechanism for performing these divers steps in my method will be taken up for description substantially in the order named. It may be stated however, that balance arms are now manufactured in seven sizes so far as length is concerned, to wit, ten inches, twelve inches, fourteen inches, sixteen inches, eighteen inches, twenty inches and twenty-two inches. The mechanism herein described for carrying out my method is adapted to manufacture any length of arm. For instance, the blanking mechanism and the mechanism employed for forming up the banks into an arm channeled in cross section comprises certain punch and die sections which are standard while other sections are removable so that the seven different sizes may be produced by one combination die. This will more fully appear from the detailed description below.

Referring to the drawings in detail the reference numeral 10 designates a standard form of press, the detailed mechanism of which has been omitted therefrom. Any suitable form of press may be employed in the practice of or for the purpose of carrying out my method. The type of press illustrated, however, is preferred because with it a plurality of separate operations may be carried on at the same time.

The press 10 is provided with suitable standards having relatively movable members 11 and 12 supported thereon, the former of which is adapted to support a plurality of removable dies or female members 13 and 14 and the latter of which is adapted to support a plurality of removable punches or male members 15 and 16. The members 11 and 12 are caused to move toward and away from each other by mechanism comprising, among other things, shaft 17, gears 18 and 19, and shaft 20, all operated from some suitable source of power through the pulley 21.

The die 13 and punch 15 attached to the press, as illustrated in Fig. 1, serves to blank the balance arm from the raw stock 22 (see Figs. 2 and 3) and when so blanked presents the shape or appearance shown by numeral 23 in Fig. 8. The die 13 is illustrated in detail in Figs. 2, 3 and 4. Referring thereto the reference numeral 24 (see Fig. 4) designates a plurality of set screws for securing the die supporting member 25 upon the lower stationary member 11 of the press. The die proper is made up of a plurality of sections designated by the numerals 26, 27, 28, 29 and 30 which sections are provided with central longitudinal slots 31, 32, 33, 34 and 35 respectively located over the rectangular groove 36 running lengthwise of the die supporting member 25, which groove serves to receive the blank 23 after it has been stamped or cut from the raw stock 22 as illustrated in Figs. 4 and 8. The groove 36 runs from one end to the other of the die supporting member 25 and its width is slightly in excess of the width of the perforations or slots 31, 32, 33, 34 and 35 of the die sections so as to enable the blank 23 to be readily removed therefrom. The numeral 37 refers to certain lines on the die sections 27 and 28 and are merely for descriptive purposes. They do not represent structure. It will be clearly apparent from the drawings that the die sections 26, 27 and 28 are each composed of two parts, one part being located adjacent one side and the other adjacent the other side of the groove 36.

The die sections 26, 27, 28, 29 and 30 are preferably secured in place on the die supporting member 25 by means of the screws 38, 39, 40, 41 and 42 respectively with a result that the die sections are removable one independently of the other. The removable die sections constitute one of the more important features of my invention, the object of which is to stamp balance arms of different lengths. In Figs. 2 and 3 the die is shown as of maximum length, that is to say for stamping balance arms having a length of approximately 22 inches. If it is desired to stamp blanks of minimum length the die sections 27 and 28 are removed and the sections 27$^a$ and 28$^a$ each composed of two parts, as shown in Fig. 6, are substituted therefor. When this is done the die sections 29 and 30 are adjusted longitudinally of the support 25 so as to abut against the substituted sections $27^a$ and $28^a$. It will therefore be seen that the sections 26, 29, and 30, which form the central and end portions of the blank, are standard for any length of arm, and that any length of blank may be formed by substituting the appropriate lengths of die sections for the sections 27 and 28. The screw threaded perforations 43 (see Fig. 6) in the die supporting member 25 are so spaced and arranged with respect to the perforations in the die sections as to readily provide the substitution for the intermediate sections 27 and 28 of other intermediate sections $27^a$ and $28^a$, each composed of two parts, as will be clearly apparent from the equal spacing thereof illustrated on the drawings. The die sections 27, 29 and 30 are also equipped with upwardly projecting studs 44 which serve to guide and properly align the raw stock 22 with respect to the die as the former is fed into the machine. The stud $44^a$ limits the inward movement of the raw stock into the press.

The perforation 31 in the die section 26 is (see Fig. 3) rectangular and serves to form the rectangular center portion $26^b$ of the blank 23 (see Fig. 8). The perforations 32 and 33 in the die sections 27 and 28 are tapered longitudinally so as to form the intermediate tapered portions $27^b$ and $28^b$ of the blank 23. And the perforations 34 and 35 in the die sections 29 and 30 are irregularly shaped so as to form the irregularly shaped end portions $29^b$ and $30^b$ of the blank.

I have described above the construction of the die and its supporting member which are employed in forming blanks 23 from the raw stock 22. I will now proceed to describe the punch or male member which cooperate with the die or female member in forming these blanks. The movable member 12 of the press 10 is equipped with a downwardly projecting member 45 to which is suitably secured by the set screws 46 the punch supporting or carrying member 47. The punch is also composed of a plurality of sections 48, 49, 50, 51 and 52 (see Fig. 5) 49, 50, 51 and 52 of which have dove tailed portions 53 slidingly and removably mounted in the grooves 54 and 55 of the carrying member 47 as illustrated in Figs. 4, 5 and 7. The punch sections 49, 50, 51 and 52 are held in place in the grooves 54 and 55 by means of the set screws 56.

The punch sections 48, 49, 50, 51 and 52 illustrated in Fig. 5 serve, in conjunction with the die sections 26, 27, 28, 29 and 30 illustrated in Fig. 3, to stamp a blank of maximum length. When it is desired to stamp a blank of decreased length the punch sections 49 and 50 are removed from the punch carrying member 47 and the two punch sections (see Fig. 7) $49^a$ and $50^a$ are substituted therefor. These punch sections $49^a$ and $50^a$ correspond to or rather are the male members for the die sections or female members $27^a$ and $28^a$ (see Fig. 6). The punch sections 48, 49, 50, 51 and 52 correspond in shape, of course, to the shape respectively of the die sections 26, 27, 28, 29 and 30. It will be observed, however, that the punch sections 48, 51 and 52, like sections 26, 29 and 30, are standard for all size of blanks to be stamped. The punch section 48, however, is held in permanent position by means of a plurality of set screws 57 which enter the member 58 projecting downwardly from and constituting an integral portion of the punch carrying member 47. This member 58 defines the inner walls of the dove tailed grooves 54 and 55.

The form of the blank stamped by the punch and die sections shown in Figs. 6 and 7 is illustrated at 59 in Fig. 9, and is composed of portions $26^b$, $27^c$, $28^c$, $29^b$ and $30^b$ corresponding to portions $26^b$, $27^b$, $28^b$, $29^b$ and $30^b$ respectively of the blank 23 illustrated in Fig. 8.

I have described in detail above the method of stamping the blanks from the raw stock. After the blanks have been so cut and stamped they are subjected to what I prefer to call the first forming-up operation. This forming-up operation of a blank is effected by the die and punch 14 and 16 previously referred to and diagrammatically illustrated in Fig. 1. It will be noted that while the die and punch 13 and 15 are forming a blank the die and punch 14 and 16 are forming-up a preceding blank. The forming die and punch are illustrated in detail in Figs. 10, 11, 12, 13 and 14. The arm formed-up thereby is shown in Fig. 15 and is designated by the numeral $23^a$.

Referring more specifically to the die illustrated in Figs. 11, 13 and 14 the reference numeral 60 designates a plurality of set screws for securing the die supporting member 61 to the stationary member 11 of the press. Supported upon the member 61 is a die (see Fig. 13) which is composed of a plurality of sections, to wit, 62, 63, 64, 65 and 66 provided respectively with perforations 67, 68, 69, 70 and 71. Normally located within the perforations of the die sections just referred to is a spring-pressed member 72 which, when the blank is subjected to a pressing operation forms the bottom of the die to assist in forming up the blank into the shape illustrated in Fig. 15 and also serves to shed the formed-up arm from the die and to enable it to be readily removed therefrom by the operator. This spring-pressed member is vertically movable in a longitudinal groove 73 in the die supporting member 61. In the pressing operation, however (see Fig. 14) the spring-pressed member 72 is moved downwardly against the springs 74 until it abuts the stop 75.

The die is equipped with a plurality of upwardly projecting fingers or pins 76 which serve to guide and align the blank 23 in proper position for the forming-up operation.

To the downwardly extending portion 45 of the downwardly movable member 12 of the press is suitably secured the punch carrying member 77 having a longitudinal dove tailed groove 78 located therein for receiving the punch sections 79, 80, 81, 82 and 83. These punch sections are held in adjusted position by means of a plurality of set-screws 84. The punch sections referred to correspond to the die sections 62, 63, 64, 65 and 66 respectively as will be clearly understood. When it is desired to form-up a balance arm from the blank 59 illustrated in Fig. 9 it is only necessary to remove the die sections 63 and 64 and punch sections 80 and 81 and to substitute therefor die sections 63ª and 64ª and punch sections 80ª and 81ª as illustrated in Figs. 16 and 17.

After the raw stock is blanked and formed-up in the manner previously set forth it is then also necessary in the manufacture of the complete arm to punch the holes 86, 87 and 88 therein as illustrated in Fig. 23. To accomplish this a suitable perforator is placed in the press in lieu of either the blanking mechanism or the forming mechanism, this perforator being clearly illustrated in Figs. 18 to 22 both inclusive. The punches and dies for perforating the ends of the balance arms are the same in construction and mode of operation and therefore it is only necessary to describe one of them. The punch and die employed for perforating the arm at the center to form the hole 87 is constructed slightly different from those which are employed for effecting the perforations 86 and 88. The die for making the perforation 86 comprises a die supporting member 89 suitably supported upon and removably secured to the stationary member 11 of the press. The die supporting member 89 is provided with a longitudinal dove-tailed groove 90 and is equipped with set screws 91 for securing the correspondingly shaped die therein. The die comprises a body portion 92 and a hollow bushing 93, the construction being such that the stock punched from the ends of the arm passes downwardly through the perforation 94 of the bushing, thence through the perforation 95 of the body portion into the clearance 96 where it may be readily removed from the machine. The die supporting member 89 is equipped with a guide member 97 rigidly secured thereto as by the bolts 98. This member 97 is provided with a guide or aligning perforation 99 for the purpose of properly aligning and guiding the punching tool 100.

As illustrated in Fig. 19 the perforator is arranged to perforate the end and central portions of the formed-up arm of maximum length. When it is desired to perforate an arm of decreased length it is only necessary to remove the set screws 91 and the bolts 98 after which the die 92—93 and the guide member 97 can be removed to any portion along the length of the die supporting member 89 as illustrated in dotted lines in Fig. 19. After the proper adjustment of the die and guide member has been made the set screws 91 are caused to enter the appropriate perforations for securing the die in place and the bolts 98 are caused to engage the proper perforations for securing the guide member in the proper position relative to the die. The die for enabling the center hole to be punched is illustrated at 101 in Fig. 19, the same being held in place by means of the set screws 102. A member 103 secured by bolts 104 to the die supporting member is provided and equipped with a perforation 105 for properly guiding and aligning the punching tool.

The tool 100 for effecting the perforation 86 is adjustably supported in the punch carrying member 106 suitably supported from the movable member 12 of the press. The tool 100 is mounted in a member 107 which is adjustable along the length of the dove-tail groove 108 of the member 106. It is held in adjusted position by means of a plurality of set screws 109. From what has been stated above it will be readily apparent how the punch may be adjusted for perforating the ends of the arms of different lengths. The punch tool 110 for effecting the perforation 87 at the center of the arm is suitably supported by a block 111 held against movement by means of set-screws 112.

Mention has been previously made to a second forming operation. The mechanism for this purpose is clearly illustrated in Fig. 24. The object of this second forming operation is to square up the center of the lever between the tapering arms as illustrated in Fig. 25. For this purpose I employ a die 113 having a V-shaped groove in the upper surfaces thereof, the walls of which form a right angle. I also employ a punch 114 in connection with this die having a rectangular downwardly projecting element 115 which is adapted to engage the interior corners of the arm at the center thereof as clearly illustrated in Fig. 24 to force the material into the angle of the female die 140 and produce a rectangular formation.

There is illustrated in Figs. 26 to 28 inclusive a punch and die which is adapted to blank and perforate the clip 120 shown in Fig. 29 from the raw stock 22 illustrated in Fig. 26. This mechanism comprises a die 121 suitably supported from the stationary member 11 of the machine. This die is supported upon a base member 122 suitably secured to the stationary member 11 of a press. Suitably secured to the base 122, as by bolts 123, is a tool aligning and guiding plate 124 the latter being spaced from the base by two members 125. These members not only act as spacers for the plate 124 but also as an aligning means for the raw stock 22 as it is fed to the press. The plate 124 is providd with an aligning perforation 126 for the blanking tool 127 and an aligning perforation 128 for the perforating tool 129. The base 122 is equipped with a die 130 located in the shouldered passage 131 and provided with a central perforation 132 through which the waste stock passes, said stock passing thence through the perforation 132 into the recess 133 located in the base of the member 122 from which it may be removed by the operator. The base 122 is also equipped with a die element 134 for stamping the clip 120 from the raw stock 22. These clips drop into the space 133 from which they may be removed by the operator. The punching tools 127 and 129 are supported by the tool punch carrier 134' to which they are rigidly secured respectively by the screw 135 and by screw 136. The tool carrier is suitably supported by the movable press member 12. It will be noted that the blanking and perforating tools act simultaneously upon the raw stock. However, the perforating tool acts to punch a hole in the blank in advance of the blanking tool. The feeding of the raw stock for a predetermined distance after each operation of the punch is controlled by means of the manually actuated stops 137 and 138, and stop 139. The latter is adopted to engage against the rear wall of the opening 140 in the stock left by punching a blank therefrom.

In Figs. 30 and 31 I have illustrated a punch 141 and a die 142 for forming up the clip to the shape illustrated at 143 in Fig. 32. The construction of both the punch element and the die element will be clearly apparent from the drawings.

After the clip is formed up as illustrated in Fig. 32 it is then spot welded to the balance arm 23ª as indicated at 144. After the weld has been effected at 144 the welding of the joints 144ª is effected. This is preferably accomplished by placing one of the lugs 143ª illustrated in Figs. 29 and 32, on the lower electrode and then bringing the upper electrode in contact with the other lug. When the current is turned on both lugs will heat and when pressure is thereafter applied the lugs will serve as the extra material needed to weld the joints at 144ª thus effecting a rigid union of the clip 143 and the arm 23ª. Either before or after the clips are welded to the ends of the arm 23ª the filler block 145 (see Fig. 33) cut from bar stock is welded to the central rectangular portion of the arm with the perforation 146 in the filler block located in alignment with the central perforation 87 in the arm. Thereafter the pivot block 147 is secured to the arm by means of the headed over pivot 148 which passes centrally therethrough and through the perforations 146 in the filler block and the perforation 87 in the arm. The pivot block is provided with perforations 149 and 150 for receiving screws or other suitable means for rigidly anchoring the pivot block to the frame of the window.

From the foregoing it will be seen that I have devised a simple, economical, and efficient method of manufacturing balance arms which not only overcomes the objections above enumerated but which has enabled me to achieve, among others, the following results over the method of manufacturing balance arms heretofore in vogue: (1) a substantial reduction in rejections and elimination of waste; (2) a substantial reduction in weight; (3) increase in strength and consequently a gain in safety; (4) a substantial reduction in store room space for the finished product; (5) a substantial reduction in the storage space required for the raw material; (6) only a comparatively small stock need be carried to meet emergencies; (7) reduction in financing as the manufacturing of the balance arms can be effected after orders have been filed; (8) due to the reduction in the weight of the arms there will be a corresponding reduction in freight and express items; and (9) the cost of the manufacture of the balance arm, according to present calculations, is at least 20% less than the cost of the manufacture of the balance arm of the old type.

I make no claim herein to the improved balance arm produced in the practice of my invention as that constitutes the subject matter of a separate application filed on even date herewith.

I have illustarted and described herein the preferred forms of apparatus for practicing my invention but it is to be expressly understood that I do not limit myself thereto nor to the steps or the sequence of steps described as many changes may be made in point of detail and embodiments resorted to in carrying out the new method without deviating from the true spirit and scope of my invention.

What I claim and desire to secure by Letters Patent is:

1. The method of manufacturing a balance arm for windows which consists in cutting a flat blank from the raw stock, subjecting said blank to a pressing operation to effect a formed-up arm channeled in cross section, subjecting said formed-up arm to a punching operation to provide its center and ends with pivot holes, and also subjecting the formed-up arm to a second forming operation to square the edges at the center thereof.

2. The method of manufacturing a balance arm for windows which consists in cutting a blank from the raw stock, subjecting said blank to a pressing operation to form a channeled construction, and thereafter squaring the edges of the central portion of said formed-up arm by a second forming operation.

3. The method of manufacturing a balance arm for windows which consists in cutting a blank from the raw stock, subjecting said blank to a forming-up operation, punching pivot holes at the center and ends thereof, and squaring the edges at the central portion thereof by a second forming operation.

4. The method of manufacturing a balance arm for windows which comprises the steps of cutting from the raw stock a flat elongated blank having a rectangular central portion, intermediate portions tapering in both directions from the central portion towards the ends, and end portions of less width than the ends of the tapered portions, pressing up the longitudinal edges of the central and intermediate portions to form up a channeled construction, squaring the edges of the central portion by a second forming operation, and punching pivot holes through the center of the central portion and through the end portions.

5. The method of manufacturing a balance arm for windows which consists in cutting a flat blank from the raw stock, subjecting said blank to a pressing operation to effect a formed-up arm channeled in cross section, subjecting said formed-up arm to a punching operation to provide its center and ends with pivot holes, subjecting the formed-up arm to a second forming operation to square the edges at the central portion thereof, and welding a filler piece in the channel of said central portion of the arm.

6. The method of manufacturing a balance arm for windows which consists in cutting a blank from the raw stock, subjecting said blank to a pressing operation to form a channeled construction, squaring the edges of the central portion of said formed-up arm by a second forming operation, and welding a filler piece in the channel of said central portion.

7. The method of manufacturing a balance arm for windows which consists in cutting a blank from the raw stock, subjecting said blank to a pressing operation to form a channeled construction tapering from a central portion toward both ends and thereafter squaring the edges of the central portion of said formed up arm by a second forming operation.

8. The method of manufacturing a balance arm for windows which consists in cutting a blank from the raw stock, subjecting said blank to a pressing operation to form a channeled construction and thereafter squaring up the central portion of said formed up arm by forcing the material at a corner into a rectangular female die by a male die acting in a plane intersecting the angle.

9. The method of manufacturing a balance arm for windows which consists in cutting a flat blank from the raw stock, subjecting said blank to a pressing operation to effect a formed up arm whereof the center and intermediate portions are channeled in cross section, subjecting said formed up arm to a punching operation to provide its center and ends with pivot holes and also subjecting the formed up arm to a second forming operation to square the edges at the center thereof.

10. The method of manufacturing a balance arm for windows which comprises the steps of cutting from the raw stock a flat elongated blank having a rectangular central portion, intermediate portions tapering in both directions from the central portions toward the ends, and end portions of less width than the ends of the tapered portions, pressing up the longitudinal edges of the central and intermediate portions to form a channeled construction, squaring the edges of the central portion by forcing the material at a corner into a longitudinal female die by a male die acting in a plane intersecting the angle and punching pivot holes through the center of the central portion and through the end portions.

11. The method of providing a balance arm for windows which comprises the steps of cutting from the raw stock a flat elongated blank having a rectangular central portion, intermediate portions tapering in both directions from the central portions toward the ends and end portions of less width than the end of the tapered portions by means of a punching die having a constant center and ends and replaceable intermediate portions, pressing up the longitudinal edges of the central and intermediate portions to form a channeled construction by means of a forming die having a constant central portion and constant end portions and replaceable intermediate portions, squaring the edges of the central portion by forcing the material at a corner into the rectangular female die by a male die acting in a plane intersecting the angle formed by two proximate sides and punching pivot holes through the center of the central portions and through the end portions.

12. The method of squaring the edges of a channel shaped stamping which comprises first scoring the material at the corner while backing up the outer marginal surfaces adjacent the corner and subsequently forcing the material adjacent the scoring into a rectangular female die, the application of force to said material being in lines parallel to a plane bisecting the angle formed by the proximate surfaces of the material.

13. The method of squaring the edges of a channel shaped stamping which comprises scoring the material at the corner while in a rectangular female die and subsequently forcing the material adjacent the scored portion into said die by an elongated male die acting in a plane bisecting the interior angle.

14. The method of squaring the edges of a channel shaped stamping which comprises scoring the material at the corner while in a rectangular female die by means of a rib on the apex of a rectangular faced male die and subsequently forcing the material adjacent the scored portion into said die by the rectangular faces of said elongated male die acting in a plane bisecting the interior angle.

In testimony whereof, I have hereunto set my hand this 16th day of January, 1925.

EDWARD H. ELLISON.